United States Patent [19]

Shimai et al.

[11] Patent Number: 5,405,529
[45] Date of Patent: Apr. 11, 1995

[54] CERAMIC FILTER AND MANUFACTURING METHOD THEREFOR

[75] Inventors: Shunzo Shimai; Koichi Imura; Kenichi Okamoto; Tadayoshi Muto, all of Tokyo, Japan

[73] Assignee: Toshiba Ceramics Co., Ltd., Tokyo, Japan

[21] Appl. No.: 92,872

[22] Filed: Jul. 19, 1993

[51] Int. Cl.⁶ .................................. B01D 71/02
[52] U.S. Cl. .................. 210/496; 210/500.25; 210/500.26
[58] Field of Search ............ 210/500.25, 500.26, 210/496, 510.1; 427/244, 246; 264/48

[56] References Cited

U.S. PATENT DOCUMENTS 5,110,470  5/1992  Yokosawa et al. ........ 210/500.26 X
5,269,926 12/1993  Webster et al. ............. 210/510.1 X

*Primary Examiner*—Frank Spear
*Attorney, Agent, or Firm*—Finnegan, Henderson Farabow, Garrett & Dunner

[57] ABSTRACT

A cylindrical support member consists of a bone-like porous ceramic member and a ceramic porous network member having a three-dimensional network structure provided outside the bone-like member so as to constitute an integral part. A ceramic membrane having a smaller pore size and serving as a filter membrane is formed on the exposed surface of the bone-like member and the surfaces of the struts of the network member by a ceramic-slurry foaming technique.

7 Claims, 2 Drawing Sheets

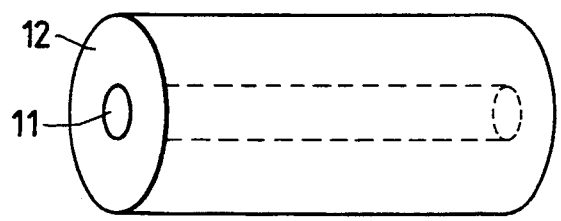
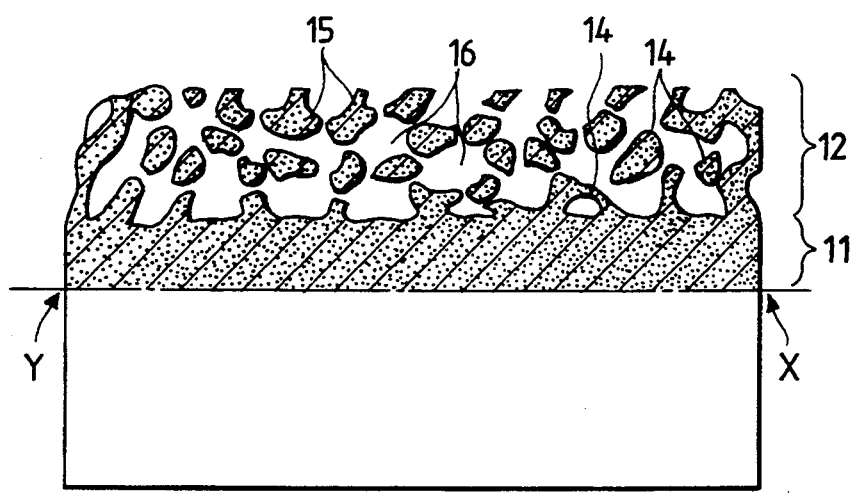

CERAMIC FILTER AND MANUFACTURING METHOD THEREFOR

BACKGROUND OF THE INVENTION

The invention relates to an improvement of ceramic filters that are used to separate and capture solids from a gas or a liquid.

As is well known, an alumina-based asymmetric ceramic membrane is used as a ceramic porous separating membrane that is employed as an in-line gas filter, etc. in semiconductor manufacturing processes. Since this membrane was originally developed for gas separation in treating a uranium material, the initial models were configured to have a simple shape, i.e., a single tube shape, to insure reliability as required in large plants. This single tube shape can most suitably be formed by extrusion molding, and later developed lotus-rhizome-shaped tubes are produced by the same molding technique.

In either of the single tube or lotus-rhizome-shaped tube, the separating membrane is formed on the inner surface of the tube or holes. The membrane has the same chemical composition as the support member, and is formed by sintering a powder of small particles.

However, in each of the single tube and the lotus-rhizome-shaped tube, the overall shape is determined by the support member which is responsible for the tube strength, and the separating membrane is formed on the inner surface of the single tube or the inner surfaces of the individual holes of the lotus-rhizome-shaped tube. Therefore, it is difficult to increase the membrane area relative to the overall volume of the tubular ceramic membrane structure. To insure a sufficient membrane area, the ceramic membrane structure becomes large and, as a result, a membrane module becomes bulky, eventually necessitating an unduly large separating machine.

As a further problem, the recent membrane technology is such that even the design concept of the ceramic module is determined by the tubular ceramic membrane structure. More specifically, modules of a little less than 1 m in length are made fundamental ones, and smaller membrane modules are produced by cutting the ceramic membrane structures and fitting the cut parts with necessary parts such as a casing and gaskets. Therefore, the minimum diameter of the modules is restricted by the thickness of the tubular ceramic membrane structure.

SUMMARY OF THE INVENTION

An object of the invention is to provide a ceramic filter having a large membrane area per unit area.

According to the invention, a ceramic filter comprises:
 a bone-like porous ceramic member for collecting a filtered fluid;
 a porous ceramic network member having a three-dimensional network structure and formed on the bone-like ceramic member; and
 a ceramic filter membrane having an average pore size smaller than that of the bone-like member and the network member, and formed on surfaces of the bone-like member and struts of the network member, the surfaces facing an input fluid to be filtered via the filter membrane.

Further, according to the invention, a method of producing a ceramic filter comprises the steps of:
 preparing a bone-like porous ceramic member;
 preparing a foamed slurry by mixing first ceramic particles with a dispersant and a binder, and agitating those;
 applying the foamed slurry to a surface of the bone-like member;
 drying and firing the foamed-slurry-applied bone-like member to produce a support member comprising the bone-like member and a porous ceramic network member having a three-dimensional network structure;
 preparing a second slurry including second ceramic particles having an average particle size smaller than that of the first ceramic particles;
 applying the second slurry to a surface of the support member;
 drying and firing the second-slurry-applied support member to produce a ceramic filter having a ceramic filter membrane having an average pore size smaller than that of the support member.

BRIEF DESCRIPTION OF THE DRAWINGS

FIG. 1 is a perspective view of a support member of a ceramic filter according to the invention;

FIG. 2 is a sectional view of the support member on which a ceramic membrane is formed;

DESCRIPTION OF THE PREFERRED EMBODIMENTS

Figure 3:
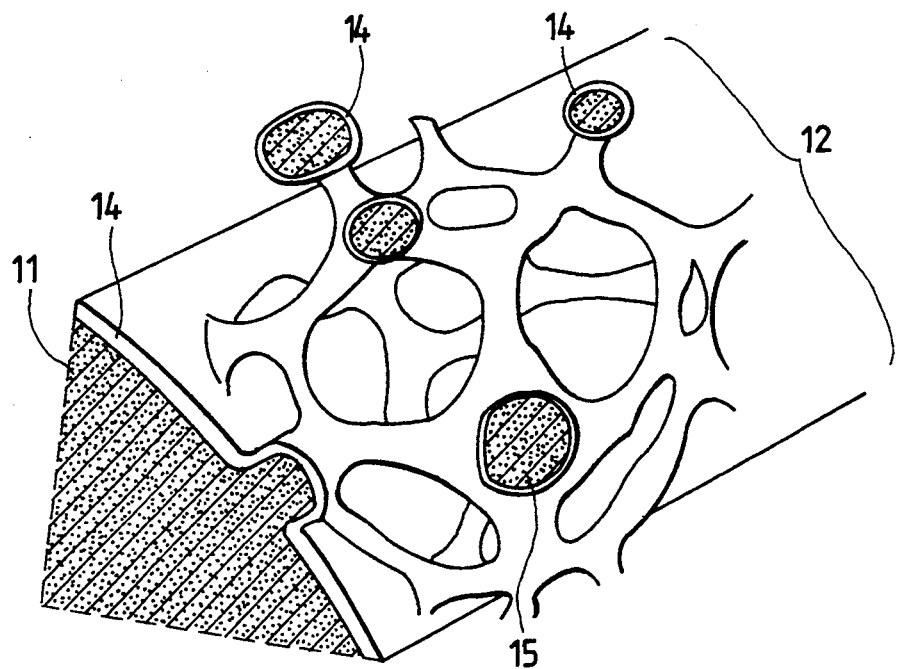
FIG. 3 is a partial enlarged perspective view of the membrane-formed support member of FIG. 2.

As is summarized above, a ceramic network member (ceramic foam member) having a three-dimensional network structure is produced by a ceramic-slurry foaming technique. This technique has an advantage that defects are hardly introduced into the network member. To avoid the occurrence of pinholes etc. in a membrane to be formed on the surface of a bone-like ceramic member and the network member, it is desired that the cross-section of the strut of the network member be made substantially circular by processing a cellular ceramic shaped body by a solvent that dissolves a binder, or by immersing the cellular ceramic shaped body in thin ceramic slip after calcination.

Conventionally, the ceramic network member having the three-dimensional network structure is produced by first making a shaped body by depositing ceramic slip on the surface of a polyurethan foam or the like, and then firing the shaped body to burn off the polyurethane foam to leave the ceramic network member. However, this technique is not preferred since it has many disadvantages, as exemplified by the following. (1) Holes are formed in those spaces initially occupied by the polyurethane foam, which will cause a significant drop in the strength of the reticulum. (2) Many microcracks develop when the ceramic slip deposited on the surface of the polyurethane foam dries and shrinks. (3) A gas generated upon decomposition of the polyurethane causes cracks to develop in the reticulum.

The reason why the ceramic network member is made porous in the invention is to use the inside of the ceramic network member as passageways of a filtered fluid. The material of the ceramic network member is determined from the required strength and the permeation resistance to a fluid.

In the invention, the bone-like ceramic member is integrated with the ceramic network member to constitute a ceramic support member. These two constituent members are basically made of the same material, and the bone-like member is thicker than the strut of the network member. The bone-like member has thick passageways to collect and pass fluids flowing thereto from the network member, so that the membrane area per unit area can effectively be increased. For example, thick passageways are formed by connecting fine channels, as in the case of the blood vessel system in animals and the vein system in plant leaves.

The porous ceramic network member can be combined with the bone-like porous ceramic member, for example, by preparing a bone-like ceramic porous material by pressure molding or some other method, working and calcining it, and inserting the calcined member into a foam as foamed, i.e., not yet dried, to produce an integral assembly. Alternatively, a shaped foam and a bone-like shaped body, which have been separately formed, are worked, calcined, assembled, and bonded to each other by the slurry for the foam.

Connected pores to present a smaller permeation resistance can be introduced into the ceramic support member (consisting of the network member and the bone-like member) by various methods. For example, there may be utilized a phenomenon that when particles having relatively large sizes are mixed with a fine powder, the larger particles are more resistant to deformation during sintering and therefore pores are likely to be introduced between the larger particles.

To form, on the surfaces of the struts of the ceramic network member and the exposed surface of the bone-like ceramic member, a ceramic membrane having fine pores smaller than those of the support member, the known immersion method may be employed in which the ceramic support member is immersed in a liquid having, in a suspended form, ceramic fine particles to become the ceramic membrane, and the suspended ceramic fine particles are deposited on the surface of the support member by causing the porous support member to absorb the liquid. To properly deposit the ceramic fine particles on the support member, the relationship between the pore size of the support member and the size of the fine particles is important. That is, if the fine particles are too small, they will enter pores of the support member.

The fine particle layer deposited on the surface of the support member can be baked onto the support member by heating. The baking conditions are determined in consideration of the degree of growth of the fine particles and the adhesion strength of the baked layer. More specifically, at higher baking temperatures, the particle growth will proceed faster to thereby create larger pores in the membrane that are produced by the fine particles, and the adhesion strength of the baked layer is increased. On the other hand, if the baking temperature is too high, the membrane will shrink so much as to cause fissure-like cracks in the membrane surface.

In the ceramic filter of the invention, the filter membrane may be formed on part of or on the entire surface of the ceramic support member consisting of the ceramic network member and the bone-like ceramic member.

EXAMPLE (1) Foaming by agitation:

Ninety parts by weight of alumina particles having an average size of 20 $\mu$m, 10 parts by weight of a high-purity alumina powder having a primary particle size of 0.2 $\mu$m, 50 parts by weight of ion-exchanged water, 5 parts by weight of methyl cellulose (binder), 5 parts by weight of ammonium stearate (foam stabilizer), and 0.5 part by weight of poly(ammonium acrylate) (dispersant) were put into an agitator and stirred to foam. (2) Formation of a circular rod:

Ninety parts by weight of alumina particles having an average size of 20 $\mu$m, 10 parts by weight of a high-purity alumina powder having a primary particle size of 0.2 $\mu$m, 20 parts by weight of ion-exchanged water, and 5 parts by weight of methyl cellulose (binder) were mixed in a mill, and the mixture was granulated by passage through a nylon sieve of 40 mesh. The granules were then dried. The resultant powder was compacted at a pressure of 50 kg/cm$^2$ into a plate measuring 50 mm×50mm×5 mm. The plate was heated in air at 1,200° C. for 1 hour to produce a calcined body, which was then machined into a circular rod measuring 4 mm$\phi$×40 mm. (3) Formation of a support member:

The circular rod prepared in step (2) was inserted into the foam prepared in step (1), and they were dried simultaneously. The dried assembly was machined into a bar measuring 10 mm$\phi$×40 mm, with the central axis of the calcined body of 4 mm$\phi$ being used as the center axis of the machining. Subsequently, the machined part was fired first in air at 1,200° C. for 1 hour and then in a hydrogen atmosphere at 1,900° C. for 2 hours, to produce a support member. As shown in FIG. 1 (and FIG. 2), the support member thus produced consisted of a central thick bone-like member 11 having a diameter of 3.9 mm and a network member 12 having a strut (15) thickness of 0.3 mm and a cell (16) size of 1 mm that surrounded the bone-like member 11. The cell 16 is a space generally enclosed by the struts 15, and corresponds to the internal space of a bubble when the network member 12 is formed. The alumina ceramic portion of the bone-like member 11 and the network member 12 had a porosity of 30% and a pore diameter of 10 $\mu$m. (4) Formation of a membrane-formed member:

Two parts by weight of a high-purity alumina powder having a primary particle size of 1 $\mu$m and an aggregate's average particle size of 3 $\mu$m was dispersed in 100 parts by weight of ion-exchanged water to prepare slip. After the support member prepared in step (3) was immersed in the slip, it was left to stand in a room for drying. The support member was then baked in air at 1,500° C. for 2 hours to have a membrane formed on its surface.

One part by weight of a high-purity alumina powder having a primary size of 0.2 $\mu$m and an aggregate's average particle size of 1 $\mu$m was dispersed in 100 parts by weight of ion-exchanged water to prepare slip. The membrane-formed member prepared above was immersed in the slip and then dried, it was baked in air at 1,200° C. for 2 hours. Thus, a membrane 14 consisting of two layers was formed as shown in FIG. 2. (5) Formation of a filter module:

One end face Y of the bone-like member 11 of the baked member was worked with a diamond grinder to remove the membrane that was formed thereon. FIG. 3 is a partial enlarged perspective view showing the boundary between the bone-like member 11 and the network member 12 at the present stage. The membrane 14 was formed on the end face X of the bone-like member 11, but not formed on (i.e., removed from) the other end face Y of the bone-like member 11. In FIG. 3, reference numeral 14 represents both of the membrane formed on the surfaces of the struts 15 of the network member 12 and the membrane formed on the surface of the bone-like member 11. The network member 12 was a porous body having large pores.

Figure 4:
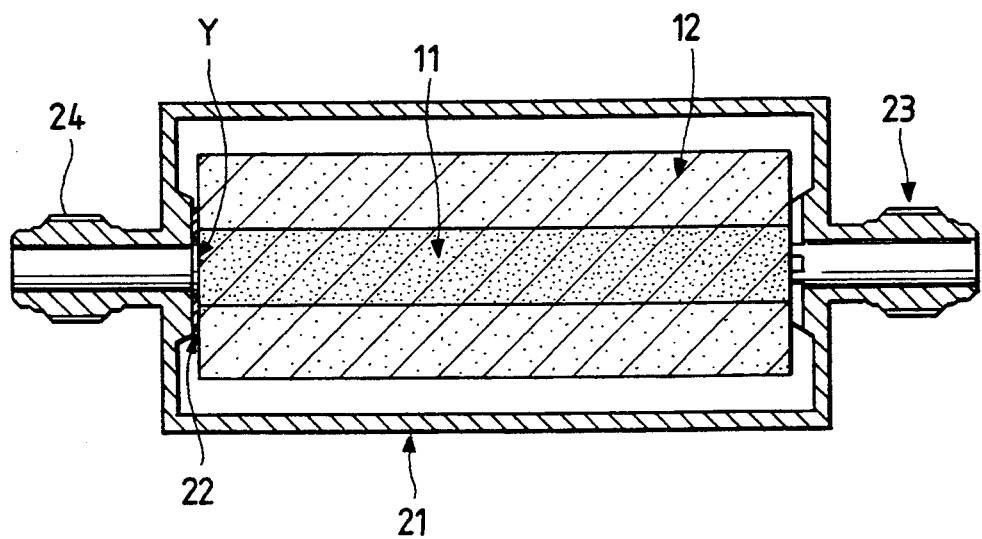
FIG. 4 is a sectional view of a filter module.

Subsequently, referring to FIG. 4, the ceramic member thus worked was secured within a stainless steel pipe 21 (inner diameter 12 mm) by means of a Teflon (trademark of Du Pont) gasket 22. A space within the stainless steel pipe 21 was coupled to a stainless steel joint 23 and made to communicate with the outer part of the ceramic member, and another stainless steel joint 24 was coupled to the inner part (bone-like member 11) via the end face Y, of which the membrane 14 had been removed as described above. Thus, a filter module was produced, which had an outer diameter of 15 mm, a length of 50 mm, a volume of 9 cm$^3$ and a membrane area of 238 cm$^2$. In contrast, a conventional filter module has an outer diameter of 50 mm, a length of 70 mm, a volume of 137 cm$^3$ and a membrane area of 143 cm$^2$.

It is noted that although the above description is made of the case of using alumina ceramics, in the invention there may be used ceramics made of other components and produced by shaping and sintering a powder. The ceramics materials include, for example, oxides such as silica, zirconia, spinel and mullite, and non-oxides such as silicon nitride and silicon carbide.

As described above, according to the invention, the ceramic filter can be provided which has a large membrane area per unit area.

What is claimed is:

1. A ceramic filter comprising:
   a bone-like porous ceramic member for collecting a filtered fluid;
   a porous ceramic network member having a three-dimensional network structure consisting of struts and cells enclosed by the struts and formed on the bone-like ceramic member; and
   a ceramic filter membrane having an average pore size smaller than that of the bone-like member and the network member, and formed on surfaces of the bone-like member and struts of the network member, the surfaces facing an input fluid to be filtered via the filter membrane
   wherein the cells of the network member are larger than ceramic particles constituting the struts of the network member.

2. The ceramic filter of claim 1, wherein the bone-like member has a rod shape, and the network member is formed on an outer surface of the bone-like member.

3. The ceramic filter of claim 1, wherein the bone-like member has a tubular shape, and the network member is formed on an inner surface of the bone-like member.

4. The ceramic filter of claim 1, further comprising an intermediate ceramic membrane having an average pore size larger than that of the filter membrane and smaller than that of the bone-like member and the network member, and formed between the filter membrane and the surfaces of the bone-like member and the network member.

5. The ceramic filter of claim 1, wherein the bone-like member has a tubular shape, and the network member is formed on an outer surface of the bone-like member.

6. A method of producing a ceramic filter, comprising the steps of:
   preparing a bone-like porous ceramic member;
   preparing a foamed slurry by mixing first ceramic particles with a dispersant and a binder, and agitating those;
   applying the foamed slurry to a surface of the bone-like member;
   drying and firing the foamed-slurry-applied bone-like member to produce a support member comprising the bone-like member and a porous ceramic network member having a three-dimensional network structure;
   preparing a second slurry including second ceramic particles having an average particle size smaller than that of the first ceramic particles;
   applying the second slurry to a surface of the support member;
   drying and firing the second-slurry-applied support member to produce a ceramic filter having a ceramic filter membrane having an average pore size smaller than that of the support member and formed on the surfaces of the bone-like member and struts of the network member.

7. The method of claim 6, further comprising the steps of:
   preparing a third slurry including third ceramic particles having an average particle size larger than that of the second ceramic particles and smaller than that of the first ceramic particles;
   applying, before applying the second slurry, the third slurry to the surface of the support member; and
   drying and firing the third-slurry-applied support member.

* * * * *